Feb. 12, 1957     C. R. CLOR     2,780,870
PIPE MEASURING APPARATUS
Filed June 3, 1955
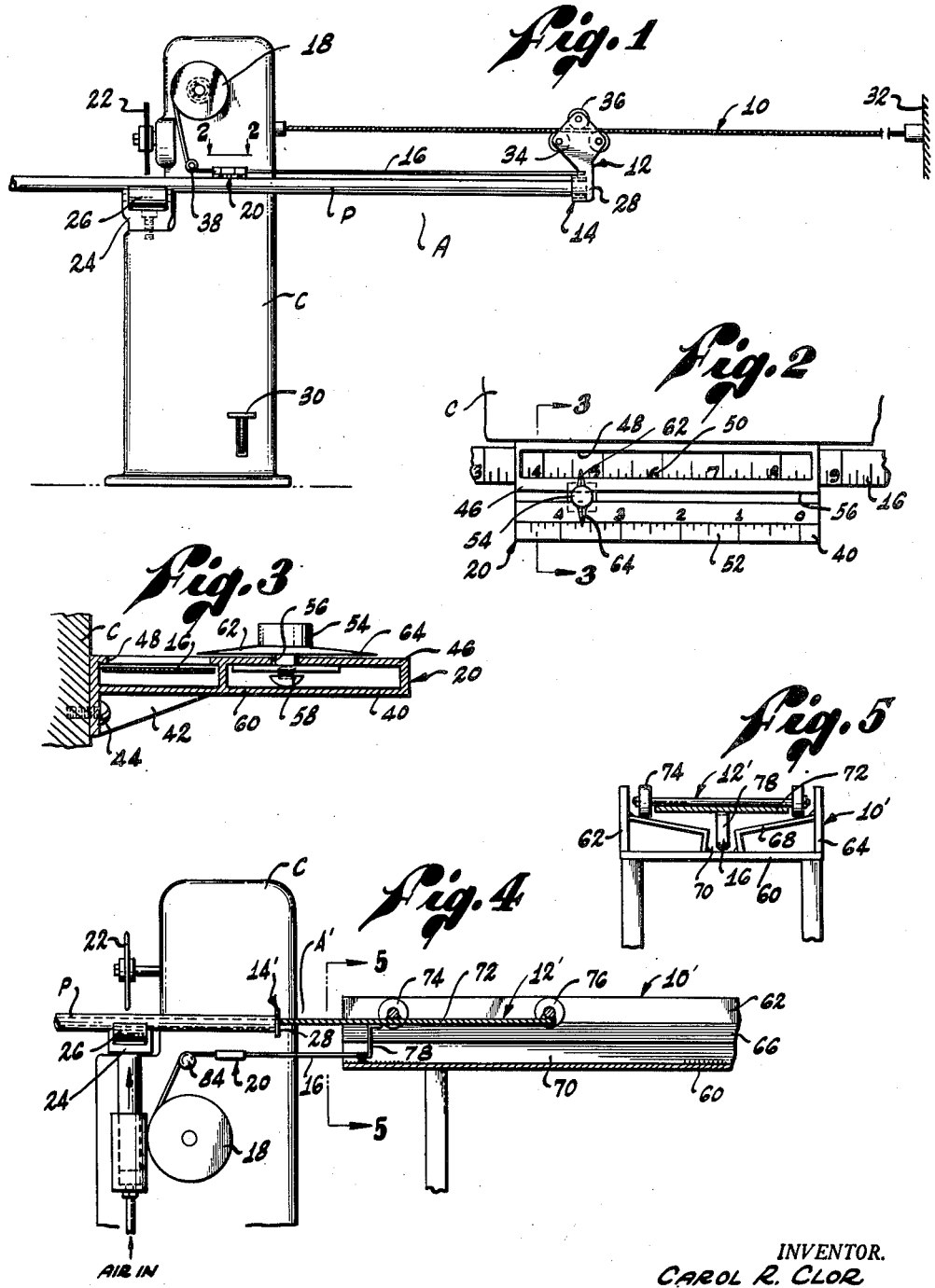
INVENTOR.
CAROL R. CLOR
BY Gulwider Mattingly & Huntly
Attorneys

United States Patent Office 2,780,870
Patented Feb. 12, 1957

2,780,870

PIPE MEASURING APPARATUS

Carol R. Clor, Los Angeles, Calif.

Application June 3, 1955, Serial No. 513,096

6 Claims. (Cl. 33—125)

The present invention relates generally to devices for measuring the lengths of elongated objects and more particularly to a novel pipe measuring apparatus.

When a plumber or pipe fitter undertakes a job which requires a number of pipes of varying lengths, he normally measures the lengths of the pipes by means of a steel measuring tape. This method of measuring pipe is not only arduous but also time consuming. Additionally, unless two workmen are utilized for such operation there is a great likelihood that mismeasurement may take place. The loss of time and money resulting from a mismeasurement of the pipe will be readily apparent.

It is a major object of the present invention to provide a novel and improved pipe measuring apparatus.

Another object is to provide pipe measuring apparatus which permits an accurate pipe measuring operation to be accomplished in a minimum amount of time by a single workman.

A further object is to provide pipe measuring apparatus which may be employed with a pipe cutting machine to automatically measure the length of a piece of pipe to be cut as the pipe is urged through the pipe cutting machine into a position to be cut by said machine.

It is another object of the invention to provide pipe measuring apparatus of the aforedescribed nature which is simple of design and rugged of construction whereby it may afford a long and useful service life.

An additional object is to provide pipe measuring apparatus which may be manufactured and sold at a comparatively low price.

Yet another object is to provide pipe measuring apparatus which is simple and fool-proof in operation and does not require any special training on the part of a workman.

A more particular object is to provide pipe measuring apparatus which incorporates unique means for automatically compensating for a fitting that is to be affixed to one or both ends of the pipe to be cut.

These and other objects and advantages of the present invention will become apparent from the following detailed description of a preferred embodiment and a modification thereof, when taken in conjunction with the appended drawings, wherein:

Figure 1 is a side elevational view showing a preferred form of pipe measuring apparatus embodying the present invention;

Figure 2 is an enlarged top plan view taken along lines 2—2 of Fig. 1;

Figure 3 is a further enlarged sectional view taken along lines 3—3 of Figure 2;

Figure 4 is a side elevational view showing an alternate form of pipe measuring apparatus embodying the present invention; and Figure 5 is a vertical sectional view taken along lines 5—5 of Figure 4.

Referring to the drawings and particularly Figure 1 thereof, there is shown a preferred form of pipe measuring apparatus A embodying the present invention. This pipe measuring apparatus A is adapted to be utilized in connection with a conventional power-operated pipe cutter C in measuring the length of a pipe P which is to be cut by said pipe cutter C. The pipe measuring apparatus A includes an elongated guide member, generally designated 10, extending away from the pipe cutter C, and a carriage member, generally designated 12, that is carried by the guide member 10 for longitudinal movement therealong. This carriage member 12 is formed with means, generally designated 14, for receiving the front end of the pipe P. A measuring tape 16 retractably carried in a spring-loaded reel 18 has its free end secured to the carriage member 12. The reel 18 is shown secured to one side of the pipe cutter C. The tape 16 passes through an indicator, generally designated 20, which is also secured to one side of the pipe cutter C. With this arrangement, as the length of pipe P to be cut is moved away from the pipe cutter C the carriage member 12 will undergo concurrent movement along the guide member 10. Such movement of the carriage member along the guide member will cause the length of tape 16 to be pulled through the indicator 20. The operator of the pipe cutter C may be afforded an accurate indication of the distance that the front end of the pipe P has been moved away from the pipe cutter C by reading the figures on the tape 16 at the indicator 20.

More particularly, the pipe cutter C may be either power or manually operated. In Figure 1 there is shown a typical power-operated cutter having a cutting disc 22 which is driven by an electric motor (not shown). Below the cutting disc 22 there is mounted a support 24 for receiving the piece of pipe P to be cut. This support 24 includes a pair of rollers 26 between which the length of pipe is urged. When the front end 28 of the pipe P has been urged to the right in the drawings for the desired distance, the pipe support 24 is urged upwardly by depressing a foot pedal 30. This effects upward movement of the pipe P whereby the cutting disc 22 may cut off the desired length of pipe. The support 24 may be caused to undergo vertical movement by means of a pneumatic cylinder and plunger arrangement.

The preferred form of pipe measuring apparatus A employs a length of steel cable for its guide member 10. One end of this cable 10 is shown securely anchored to the front of the pipe cutter C while the opposite end thereof is shown anchored to an adjoining fixed structure 32. The carriage member 12 includes a body 34 whereon are mounted three rollers 36 which encompass the cable 10. The lower end of the body 34 is formed with a socket 14 which serves as the receiving means for the front end 28 of the pipe P. The measuring tape 16 will preferably be formed of steel and it is shown as passing over a guide roller 38 mounted on one side of the pipe cutter C rearwardly of the indicator 20.

Referring now to Figures 2 and 3, the preferred form of indicator includes a generally hollow, rectangular body 40 formed at its underside with a lug 42 that is adapted to be secured to one side of the pipe cutter C as by bolts 44. The upper plate 46 of the body 40 is formed with an elongated window 48 through which the indicia 50 on the measuring tape 16 may be viewed. The upper plate 46 is seen to be imprinted with a rule 52 which is complementary to that imprinted upon the face of the measuring tape 16. A pointer element 54 is slidable along a slot 56 formed in the body's upper plate 46. This slot 56 extends parallel to the window 48 and the rule 52. The pointer element 54 is shown formed with a spring-loaded button 58 which abuts the lower plate 60 of the body and permits the pointer to be adjustably anchored at any point along the length of the slot 56. The pointer element 54 is formed with two aligned points 62 and 64 which are arranged normal to the length of the window 48 and the rule 52.

In the operation of the aforedescribed preferred embodiment of the invention, as the length of pipe P to be cut is moved to the right in Figure 1 the measuring tape 16 will be pulled through the window 48 of the indicator 20. Assuming that a length of pipe 6 feet 4⅝ inches is to be cut, the pointer element 54 of the indicator 20 will be set so that point 64 rests at "0" on rule 52. Next, the carriage member 12 will be moved to the right in Figure 1 until the 6 foot 4⅝ inch mark of the tape 16 is aligned with the point 62 of the pointer 54. The pipe P will then be moved upwardly towards the cutting disc 22 so as to cut off the piece of pipe to the right of such cutting disc. The length of this piece of pipe will be exactly 6 feet 4⅝ inches.

In some instances it is desirable to form one or both end of the pipe to be cut with threads for receiving different types of fittings. The reduction in the length of pipe occasioned by the use of such fittings may be either computed or located in suitable handbooks. Thus, it may be assumed by way of example that a length of pipe plus a fitting for one end thereof is to equal 6 feet 4⅝ inches from one end of the pipe to the center of said fitting which is to be threaded to the opposite end of the pipe. It may be further assumed that the normal 6 feet 4⅝ inches length of the pipe should be reduced 3⅝ inches in order to compensate for the added length resulting from the use of the fitting. Under these circumstances, the pointer element 54 will be moved to the left from its zero position on the rule 52 a distance of 3⅝ inches, as indicated in Figure 2. Thereafter, the carriage member 12 will be moved to the right in Figure 1 until the figure "6 feet 4⅝ inches" appears on the tape 16 in alignment with the point 64 of the pointer element 54. This is the condition illustrated in Figure 2. The pipe P is then cut and it will be apparent that the necessary 3⅝ inches will have been subtracted from its length.

Referring now to Figures 4 and 5, there is shown an alternate embodiment of pipe measuring apparatus embodying the present invention. This alternate embodiment A' is also adapted to be utilized in conjunction with a conventional power-operated pipe cutter C similar to that of Figure 1. It will be observed, however, that instead of employing a stretched cable for the guide member 10', an elongated metal track is employed. This track 10' includes a bottom wall 60, a pair of upstanding side walls 62 and 64 and a pair of downwardly and inwardly inclined support elements 66 and 68. The proximate edges of these support elements are angled downwardly so as to define a space 70. The carriage member 12' includes a body 72 whereon are mounted front and rear pairs of rollers 74 and 76. A rigid arm 78 depends from the underside of this body 72 into the space 70 between the support elements 66 and 68. The free end of the measuring tape 16 is secured to the lower end of this arm 78. A vertical plate 14' is rigidly affixed to the rear end of the body 72 so as to serve as a pipe receiving means for the front end 28 of the length of pipe P to be cut. The tape 16 is retractably mounted by a spring-loaded reel 18. This reel 18 is shown secured to one side of the pipe cutter C below the indicator 20. A guide roller 84 is mounted above and to one side of the indicator 20. The indicator 20 may be constructed in accordance with Figures 2 and 3. It will be apparent that the operation of this alternate embodiment of the invention is similar to that described in conjunction with the preferred embodiment thereof.

While there has been shown and described hereinbefore what is presently considered to be the preferred and one alternate embodiment of the present invention, it will be apparent that various modifications and changes may be made thereto without departing from the spirit of the invention or the scope of the following claims. For example, although the measuring apparatus has been described as being utilized in conjunction with the measuring of pipe it will be apparent that it may also be utilized to measure other elongated objects.

I claim:

1. Pipe measuring apparatus for use with a pipe cutter, comprising: an elongated guide member which extends away from said pipe cutter; a carriage member carried by said guide member for longitudinal movement therealong; pipe-receiving means formed on said carriage member; a measuring tape secured at one of its ends to said carriage member; mounting means for said measuring tape anchorable adjacent said pipe cutter; an indicator anchorable adjacent said pipe cutter having a body through which said measuring tape is pulled during longitudinal movement of said carriage member; an elongated window formed in said body through which said measuring tape may be viewed; a rule having indicia complementary to that of said tape imprinted on said body parallel to the length of said window; and a pointer element supported by said body whereby it may be adjustably anchored at any point along the length of said window and said rule.

2. Pipe measuring apparatus as set forth in claim 1 where said guide member includes a steel cable, said carriage member includes a body whereon are mounted a plurality of rollers which encompass said cable and said pipe-receiving means is a socket formed on the lower end of said body.

3. Pipe measuring apparatus as set forth in claim 1 where said guide member includes a horizontal metal track, said carriage member includes a body to which are attached rollers that ride upon said track and said pipe-receiving means is a vertical plate formed on said body.

4. Pipe measuring apparatus for use with a pipe cutter, comprising: an elongated guide member that extends away from said pipe cutter; a carriage member carried by said guide member for longitudinal movement therealong; pipe-receiving means formed on said carriage member; a flexible measuring tape secured at one of its ends to said carriage member; a reel for retractably holding said measuring tape, said reel being anchorable adjacent said pipe cutter; an indicator anchorable adjacent said pipe cutter having a body through which said measuring tape is pulled during longitudinal movement of said carriage member; an elongated window formed in said body through which said measuring tape may be viewed; a rule having indicia complementary to that of said tape imprinted on said body parallel to the length of said window; and a pointer element supported by said body whereby it may be adjustably anchored at any point along the length of said window and said rule.

5. Pipe measuring apparatus as set forth in claim 4 where said guide member includes a steel cable, said carriage member includes a body whereon are mounted a plurality of rollers which encompass said cable and said pipe-receiving means is a socket formed on the lower end of said body.

6. Pipe measuring apparatus as set forth in claim 4 where said guide member includes a horizontal metal track, said carriage member includes a body to which are attached rollers that ride upon said track and said pipe-receiving means is a vertical plate formed on said body.

References Cited in the file of this patent

UNITED STATES PATENTS

| | | |
|---|---|---|
| 259,556 | Kulman | June 13, 1882 |
| 969,858 | Hamilton | Sept. 13, 1910 |
| 1,337,260 | Pauk | Apr. 20, 1920 |
| 2,023,408 | Coll | Dec. 10, 1935 |
| 2,261,214 | Bierman | Nov. 4, 1941 |
| 2,262,178 | Gest et al. | Nov. 11, 1941 |

FOREIGN PATENTS

| | | |
|---|---|---|
| 1,055,489 | France | Oct. 14, 1953 |